United States Patent
Yang et al.

(10) Patent No.: US 8,079,121 B2
(45) Date of Patent: Dec. 20, 2011

(54) PRESSING DEVICE FOR LATCHING AND RELEASING CHUCKING DEVICE

(75) Inventors: Ming-Lu Yang, Taipei Hsien (TW); Ya-Dong Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1025 days.

(21) Appl. No.: 11/967,117

(22) Filed: Dec. 29, 2007

(65) Prior Publication Data

US 2008/0290614 A1 Nov. 27, 2008

(30) Foreign Application Priority Data

May 24, 2007 (CN) .......................... 2007 1 0200701

(51) Int. Cl.
 *B23P 19/04* (2006.01)
(52) U.S. Cl. .................... 29/238; 29/281.1; 29/281.6
(58) Field of Classification Search .................... 29/238, 29/239, 255, 270, 278, 281.1, 281.5, 281.6
 See application file for complete search history.

(56) References Cited

U.S. PATENT DOCUMENTS

| | | | | |
|---|---|---|---|---|
| 2,302,943 | A * | 11/1942 | Haselwood | 269/269 |
| 2,948,172 | A * | 8/1960 | Sloboda et al. | 269/274 |
| 4,852,866 | A * | 8/1989 | Kristoff | 269/87.2 |
| 4,854,568 | A * | 8/1989 | Baeza et al. | 269/268 |
| 5,593,258 | A | 1/1997 | Matsumoto et al. | |
| 6,152,435 | A * | 11/2000 | Snell | 269/43 |
| 6,908,085 | B2 | 6/2005 | Gerber | |
| 6,976,670 | B1 * | 12/2005 | Woolley et al. | 254/30 |
| 7,013,545 | B1 * | 3/2006 | Ritchie | 29/243.5 |
| 2008/0290614 | A1 * | 11/2008 | Yang et al. | 279/155 |

FOREIGN PATENT DOCUMENTS

| | | |
|---|---|---|
| CN | 1652420 A | 8/2005 |
| TW | 200714405 | 4/2007 |
| TW | 200718490 | 5/2007 |
| TW | 200722211 | 6/2007 |
| TW | M314089 | 6/2007 |
| WO | 0047411 | 8/2000 |

* cited by examiner

*Primary Examiner* — Lee D Wilson
(74) *Attorney, Agent, or Firm* — Altis Law Group, Inc.

(57) ABSTRACT

An exemplary pressing device (100) includes a first movable member (10) and a second movable member (20). Each of the first and second movable members includes an upper clamping element (11, 21) and a lower clamping element (12, 22). The upper clamping element has a first fringe portion and a plurality of first latching grooves (111, 211) having different sizes are defined in the first fringe portion. The lower clamping element has a second fringe portion and a plurality of second latching grooves (121, 221) having different sizes are defined in the second fringe portion. Each first latching groove of the second movable member has a same size as that of a corresponding first latching groove of the first movable member. Each second latching groove of the second movable member has a same size as that of a corresponding second latching groove of the first movable member.

17 Claims, 10 Drawing Sheets

PRESSING DEVICE FOR LATCHING AND RELEASING CHUCKING DEVICE

BACKGROUND OF THE INVENTION

1. Field of the Invention

The present invention generally relates to pressing devices, and more particularly, to a pressing device for latching and releasing a chucking device which is used for holding a cutting tool.

2. Discussion of the Related Art

A cutting tool, for example a milling cutter, is generally used in a machining process for machining a mold or any other workpieces. Before the machining process, the cutting tool should be mounted in a chucking device. The chucking device together with the cutting tool is then mounted in a machine tool.

A typical chucking device generally includes a collet and a collet holder. The principle of the chucking device is disclosed in U.S. Pat. No. 6,908,085. The chucking device is suitable for tools, in particular cutting tools. A cylindrical bore defined in the collet serves to accommodate the shank of the tool. A plurality of radially directed slots is defined in a sidewall of the collet for increasing radial elasticity of the collet. A tapered recess is defined in the collet holder for receiving the collet. The taper angle of the tapered recess is smaller than the self-locking angle. When the collet with inserted tool is pressed into the tapered recess of the collet holder, there is a radial pressure, by means of which the tool is securely held. Since the taper angle is smaller than the self-locking angle, the collet, once it has been pressed in, no longer has to be additionally fastened in the collet holder.

The collet is generally pressed to move into or out of the tapered recess of the collet holder by a pressing device so as to be latched to or be released from the collet holder. The pressing device includes a first movable member and a second movable member, a driving structure for driving the first movable member to move. Each of the first and second movable members includes an upper clamping element and a lower clamping element. Each of the upper clamping elements of the first and second movable members defines a first latching groove. The first latching grooves of the upper clamping elements of the first and second movable members cooperatively form a first clamping hole for clamping the collet. The first clamping hole has a size corresponding to that of the collet. Similarly, each of the lower clamping elements of the first and second movable members defines a second latching groove. The second latching grooves of the lower clamping elements of the first and second movable members cooperatively form a second clamping hole for clamping the collet holder. The second clamping hole has a size corresponding to that of the collet holder.

To use the pressing device, the first and second movable member are disposed in the driving structure, and the first and second movable member separate from each other. The collet of the chucking device is partly received in the first latching groove of the first movable member or in the first latching groove of the second movable member. The collet holder of the chucking device is partly received in the second latching groove of the first movable member or in the second latching groove of the second movable member. The first and second movable members abut each other, thereby forming the first clamping hole for clamping the collet and the second clamping hole for clamping the collet holder. The upper clamping elements are driven by the driving structure to move together with the collet towards the lower clamping elements so that the collet is inserted into the collet holder. Thus, the collet together with the inserted cutting tool is latched in the collet. If the collet with the inserted cutting tool is to be released from the collet, the upper clamping elements are driven to move together with the collet away from the lower clamping elements. Thus, the collet with the inserted cutting tool is pulled out of the collet holder.

The sizes of the first and second latching grooves of the first and second movable members of the pressing device are determined by the size of the collet and the collet holder of the chucking device. If a size of the tool is changed, the chucking device must be changed accordingly. Therefore, different tools need different chucking devices to be mounted and different chucking devices need different latching grooves of movable members of the pressing device. However, the pressing device described above is only suitable for one kind of tool and the corresponding chucking device for the tool. If a different tool needs to be mounted in the chucking device, the first and second movable members of the pressing device are generally replaced by the appropriate first and second movable members, in order to define corresponding latching grooves. Having to frequently change the first and second movable members for a different tool costs time and a service life of the pressing device will be reduced. The typical pressing device is not convenient to be used for assembling tools having different sizes to the corresponding chucking devices.

Therefore, a new pressing device is desired in order to overcome the above-described shortcomings.

SUMMARY

A pressing device includes a first movable member and a second movable member. Each of the first and second movable members includes an upper clamping element and a lower clamping element. The upper clamping element has a first fringe portion and a plurality of first latching grooves having different sizes are defined in the first fringe portion. The lower clamping element has a second fringe portion and a plurality of second latching grooves having different sizes are defined in the second fringe portion. Each first latching groove of the second movable member has a same size as that of a corresponding first latching groove of the first movable member. Each second latching groove of the second movable member has a same size as that of a corresponding second latching groove of the first movable member.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present pressing device. Moreover, in the drawings, like reference numerals designate corresponding parts throughout the several views, and all the views are schematic.

DETAILED DESCRIPTION OF THE EMBODIMENTS

Reference will now be made to the drawings to describe preferred embodiments of the present pressing device in detail.

Figure 1:
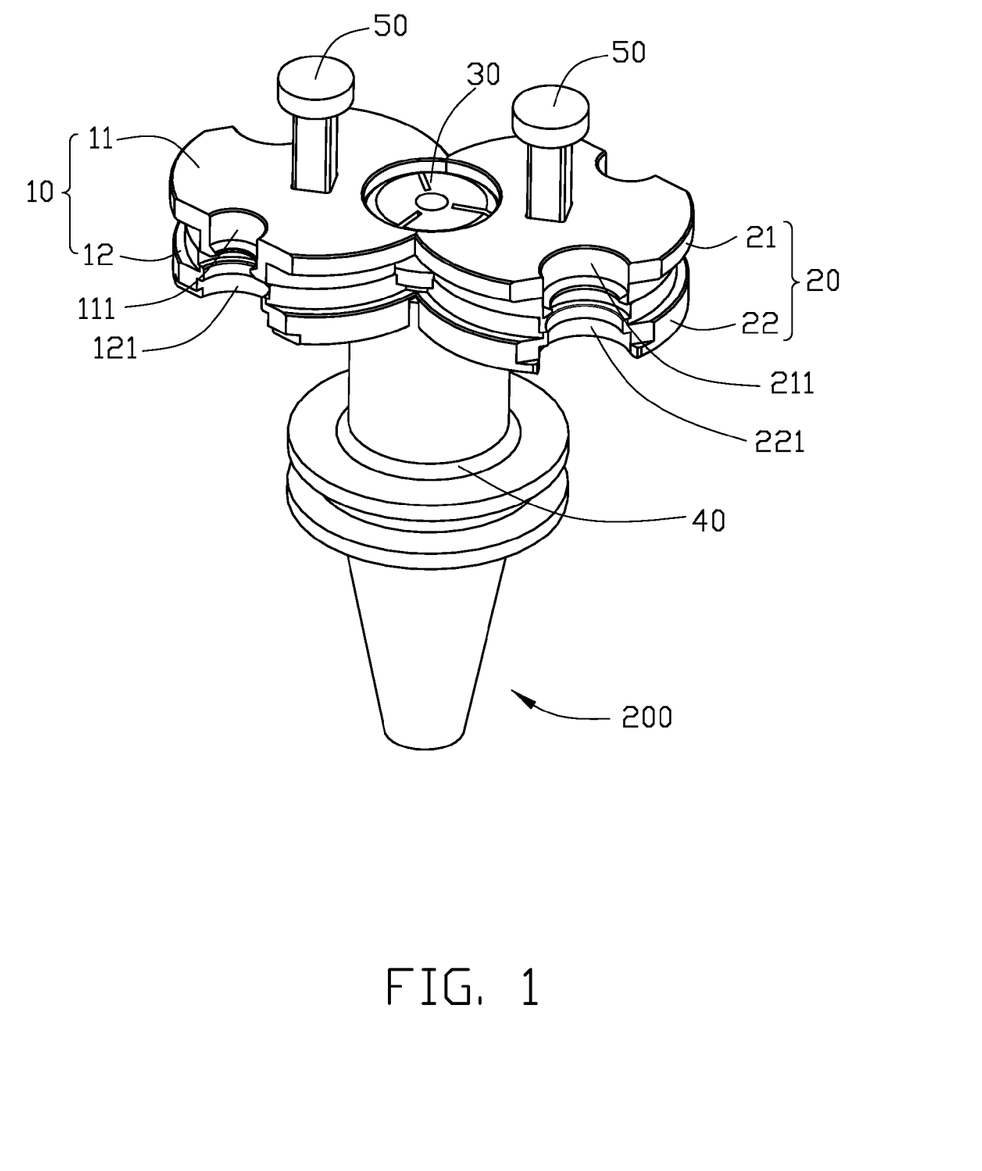
FIG. 1 is an assembled, isometric view of a pressing device in accordance with a preferred embodiment of the present invention, including a chucking device clamped by the pressing device.
Figure 5:
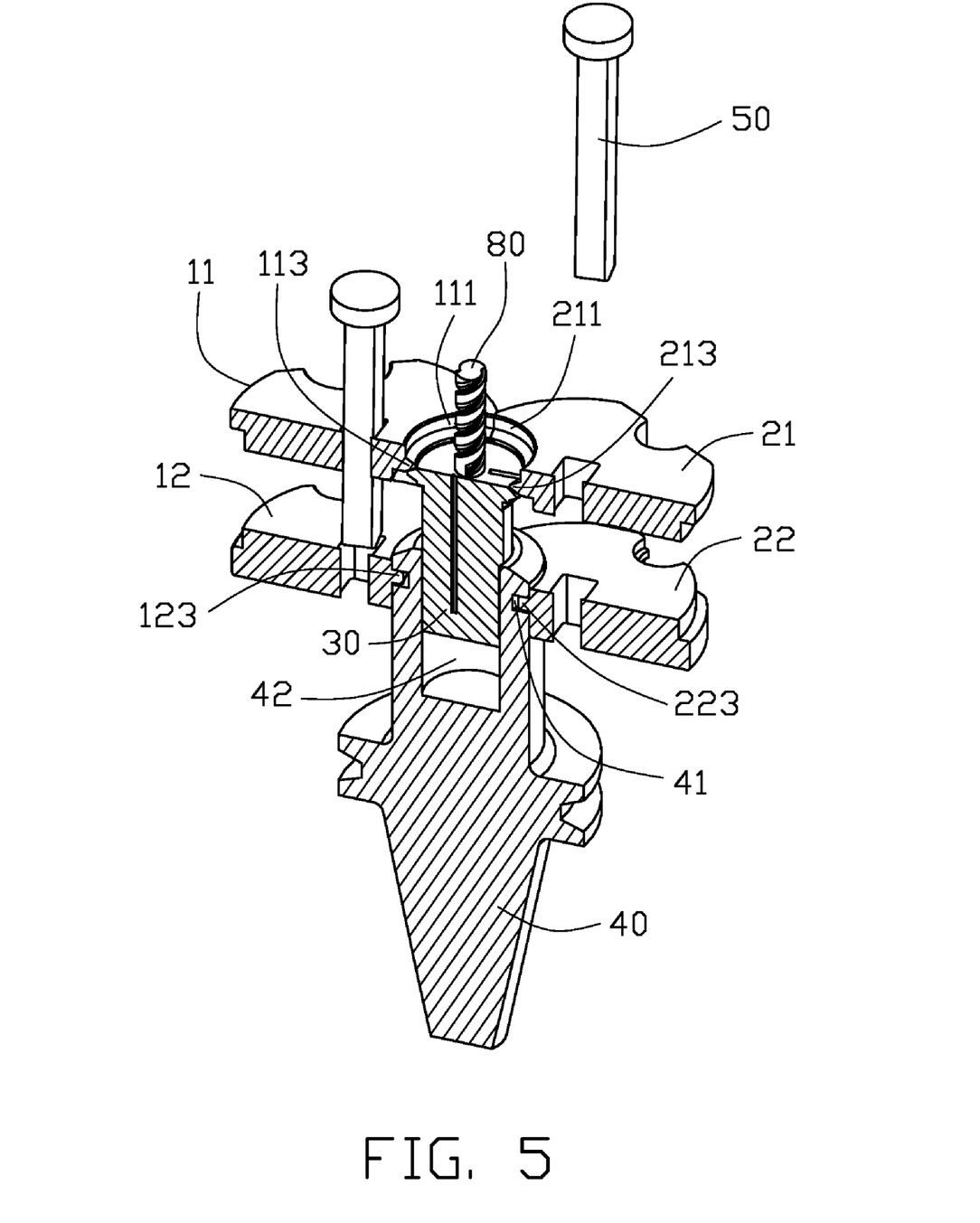
FIG. 5 is a cross-sectional view of the pressing device, and showing one end of the collet with a cutting tool partly inserted into the collet holder.
Figure 9:
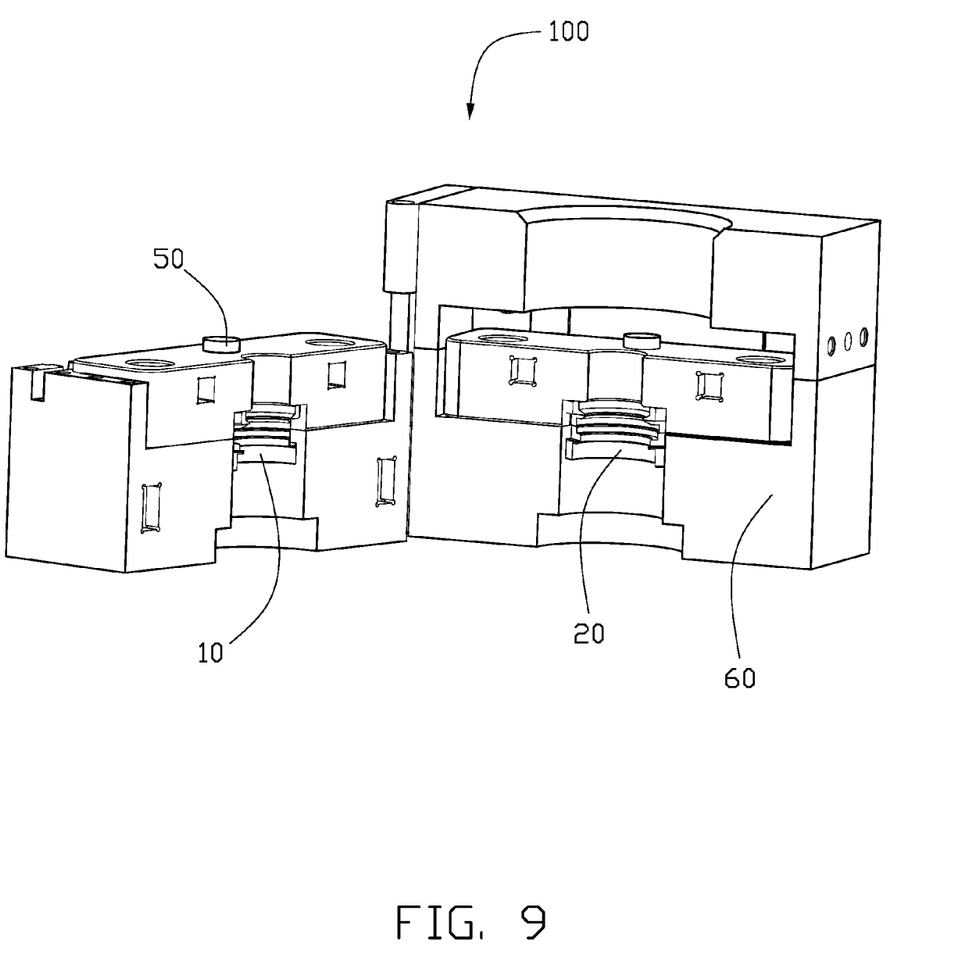
FIG. 9 is an isometric view of a driving structure, the pressing device of FIG. 1 mounted in the driving structure.

Referring to FIGS. 1, 5, and 9, a pressing device 100 in accordance with a preferred embodiment is shown. The pressing device 100 includes a first movable member 10, a second movable member 20, a pair of mounting shafts 50, and a driving structure 60. The pressing device 100 is configured for latching and releasing a chucking device 200. The chucking device 200 includes a collet 30 and a collet holder 40. The collet 30 is configured to receive a cutting tool 80 (see FIG. 5), for example a milling cutter. A cylindrical bore (not labeled) defined in the collet 30 serves to accommodate the shank of the cutting tool 80. A plurality of radially directed slots (not labeled) is defined in a side wall of the collet 30 for increasing the radial elasticity of the collet 30. The collet holder 40 is configured to clamp one end of the collet 30. A tapered recess 42 coaxial to the collet 30 is defined in the collet holder 40 for receiving the collet 30. The taper angle of the tapered recess 42 is smaller than the self-locking angle. When the collet 30, with the inserted cutting tool 80, is pressed into the tapered recess 42 of the collet holder 40, there is a radial pressure, by means of which the cutting tool 80 is securely held. Since the taper angle is smaller than the self-locking angle, the collet 30, once it has been pressed in, is securely fastened in the collet holder 40.

Figure 2:
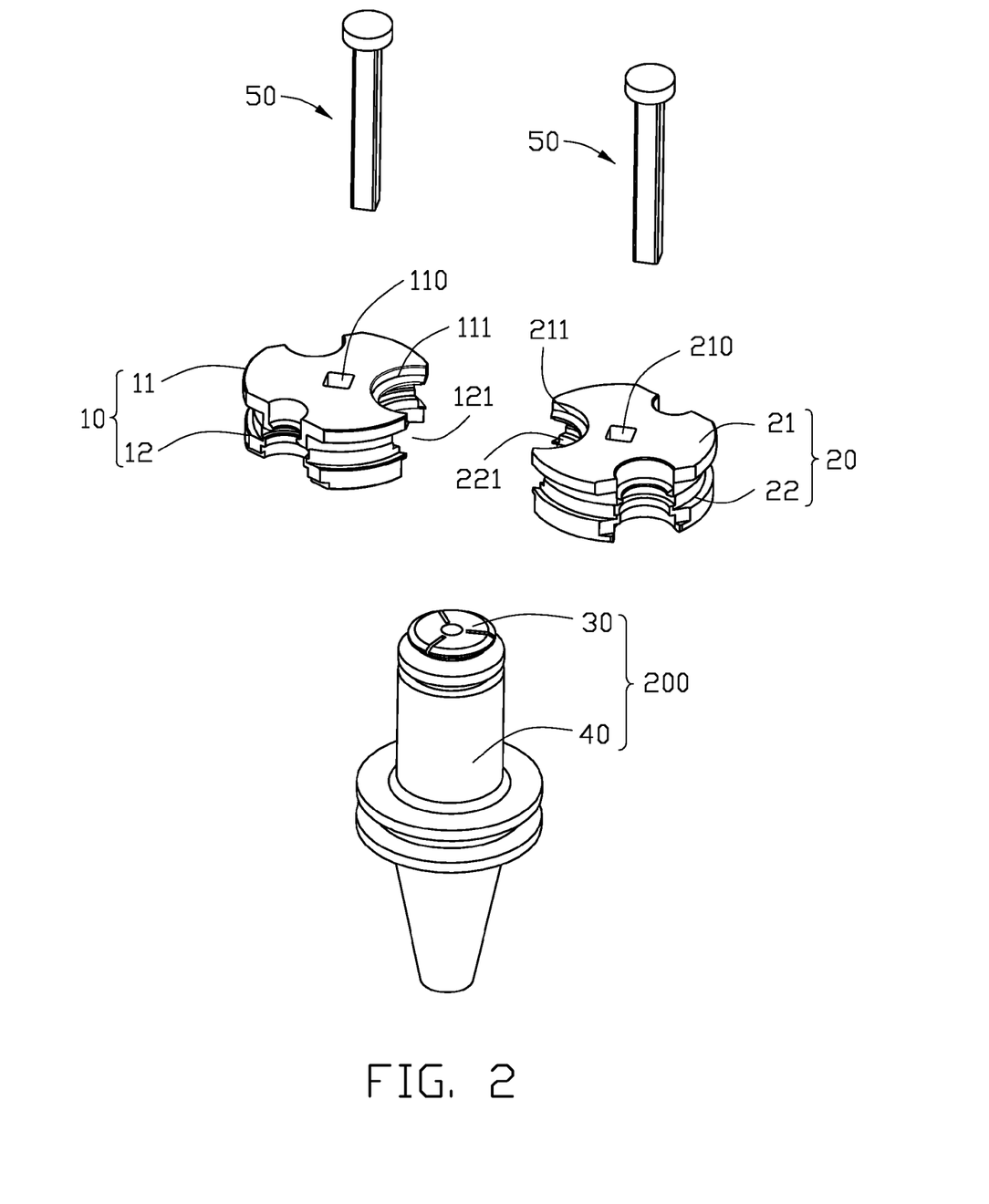
FIG. 2 is an exploded view of the pressing device with the chucking device shown in FIG. 1.
Figure 3:
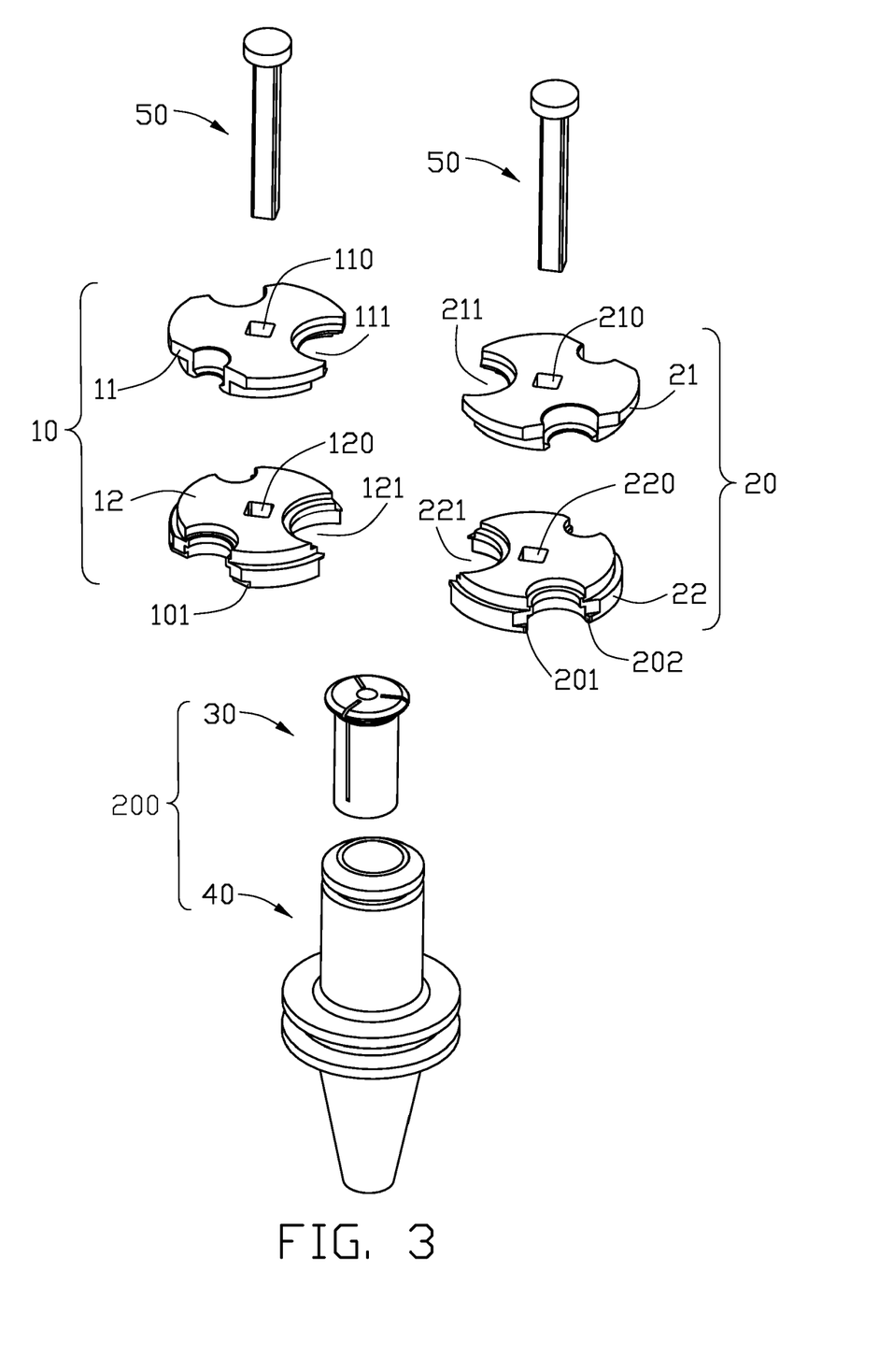
FIG. 3 is another exploded view of the pressing device with the chucking device shown in FIG. 1.

Referring to FIGS. 2 and 3, the first movable member 10 includes an upper clamping element 11 and a lower clamping element 12. Each of the upper clamping element 11 and the lower clamping element 12 of the movable member 10 defines a through hole 110, 120 for one of the mounting shafts 50 extending therethrough. The upper clamping element 11 and the lower clamping element 12 can be attached together by and rotate with the mounting shaft 50. Similarly, the second movable member 20 also includes an upper clamping element 21 and a lower clamping element 22. Each of the upper clamping element 21 and the lower clamping element 22 defines a through hole 210, 220 for the remaining mounting shaft 50 to extend therethrough and the remaining mounting shaft 50 is able to be rotated together with the upper clamping element 21 and the lower clamping element 22 of the second movable member 20.

The upper clamping element 11 of the first movable member 10 defines a plurality of first latching grooves 111 having different sizes in the fringe portion of the upper clamping element 11. The lower clamping element 12 of the first movable member 10 defines a plurality of second latching grooves 121 having different sizes in the fringe portion thereof. The first and second latching grooves 121 are substantially semi-circular. In the preferred embodiment, a number of the first latching grooves 111 and a number of the second latching grooves 121 are both three. Each of the first latching grooves 111 has a radius corresponding to a radius of an appropriate collet, and each of the second latching grooves 121 has a radius corresponding to a collet holder corresponding to that appropriate collet. The first latching grooves 111 are evenly arrayed along a circle having a same center point as the upper clamping element 11 of the first movable member 10. The second latching grooves 121 are evenly arrayed along a circle having a same center point as the lower clamping element 12 of the first movable member 10.

Figure 4:
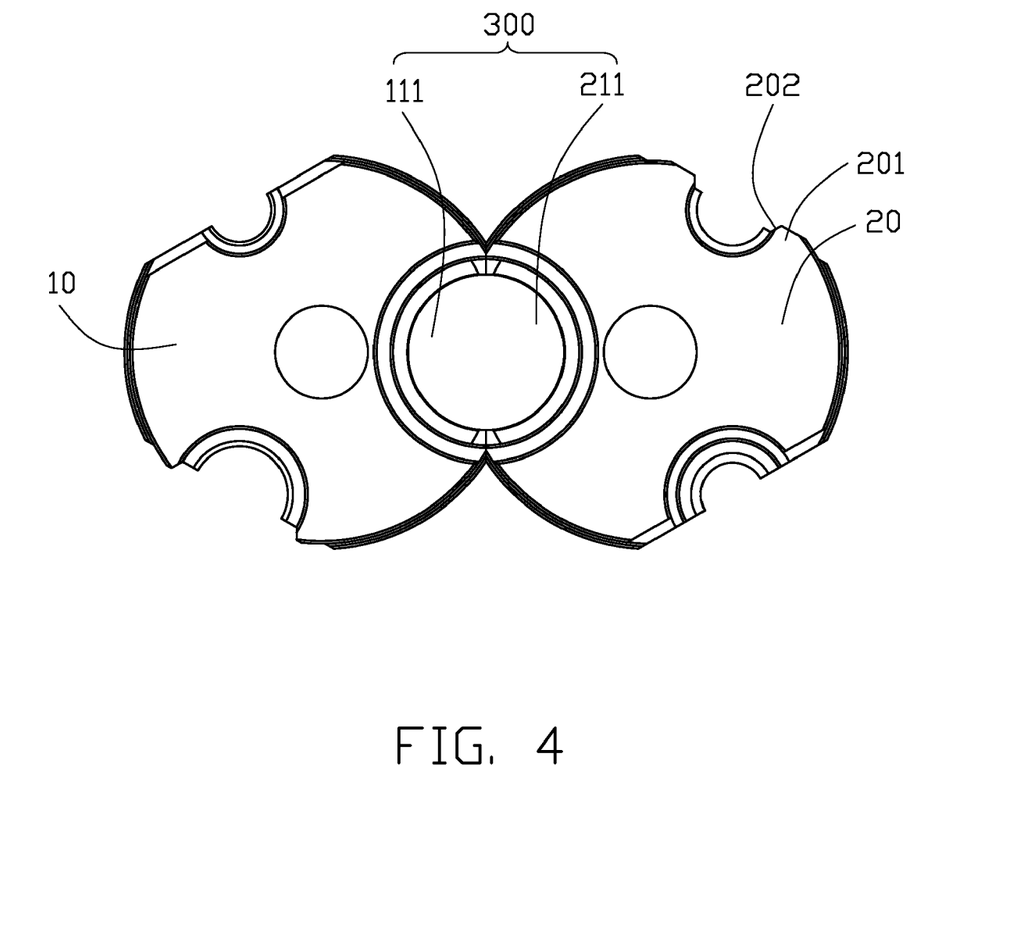
FIG. 4 is a bottom plan view of the pressing device shown in FIG. 1.

Referring to FIGS. 3 and 4, the upper clamping element 21 of the second movable member 20 defines a plurality of first latching grooves 211 having different sizes in a fringe portion of the upper clamping element 21. The lower clamping element 22 of the second movable member 20 defines a plurality of second latching grooves 221 having different sizes in a fringe portion thereof. The first and second latching grooves 221 are substantially semicircular. In the preferred embodiment, a number of the first latching grooves 211 and a number of the second latching grooves 221 are both three. Each first latching groove 211 of the second movable member 20 has a same size as that of one corresponding first latching groove 111 of the first movable member 10. Each of the first latching grooves 111 of the first movable member 10 and a corresponding first latching groove 211 of the second movable member 20 cooperatively define a circular clamping hole 300 for clamping the collet 30. Each of the second latching grooves 221 of the second movable member 20 has a same size as that of one corresponding second latching groove 121 of the first movable member 10. Each of the second latching grooves 121 of the first movable member 10 and a corresponding second latching groove 221 of the second movable member 20 cooperatively define a circular clamping hole for clamping the collet holder 40.

The first movable member 10 defines a locating groove 101 in a portion adjoining each second latching groove 121. A locating protrusion 201 is formed at a portion adjoining each corresponding second latching groove 221 of the second movable member 20. Each locating protrusion 201 is configured for engaging in one corresponding locating groove 101, thus each of the second latching grooves 121 of the first movable member 10 and a corresponding second latching groove 221 of the second movable member 20 cooperatively clamp the collet holder 40. It should be understood that, the locating groove can also be defined in the portion adjoining each second latching groove 221 of the second movable member 20, and the corresponding locating protrusion 201 is formed at the portion adjoining each corresponding second latching groove 121 of the first movable member 10. Each locating protrusion 201 includes an oblique guiding surface 202 for guiding the chucking device 200 into the second movable member 20.

Figure 6:
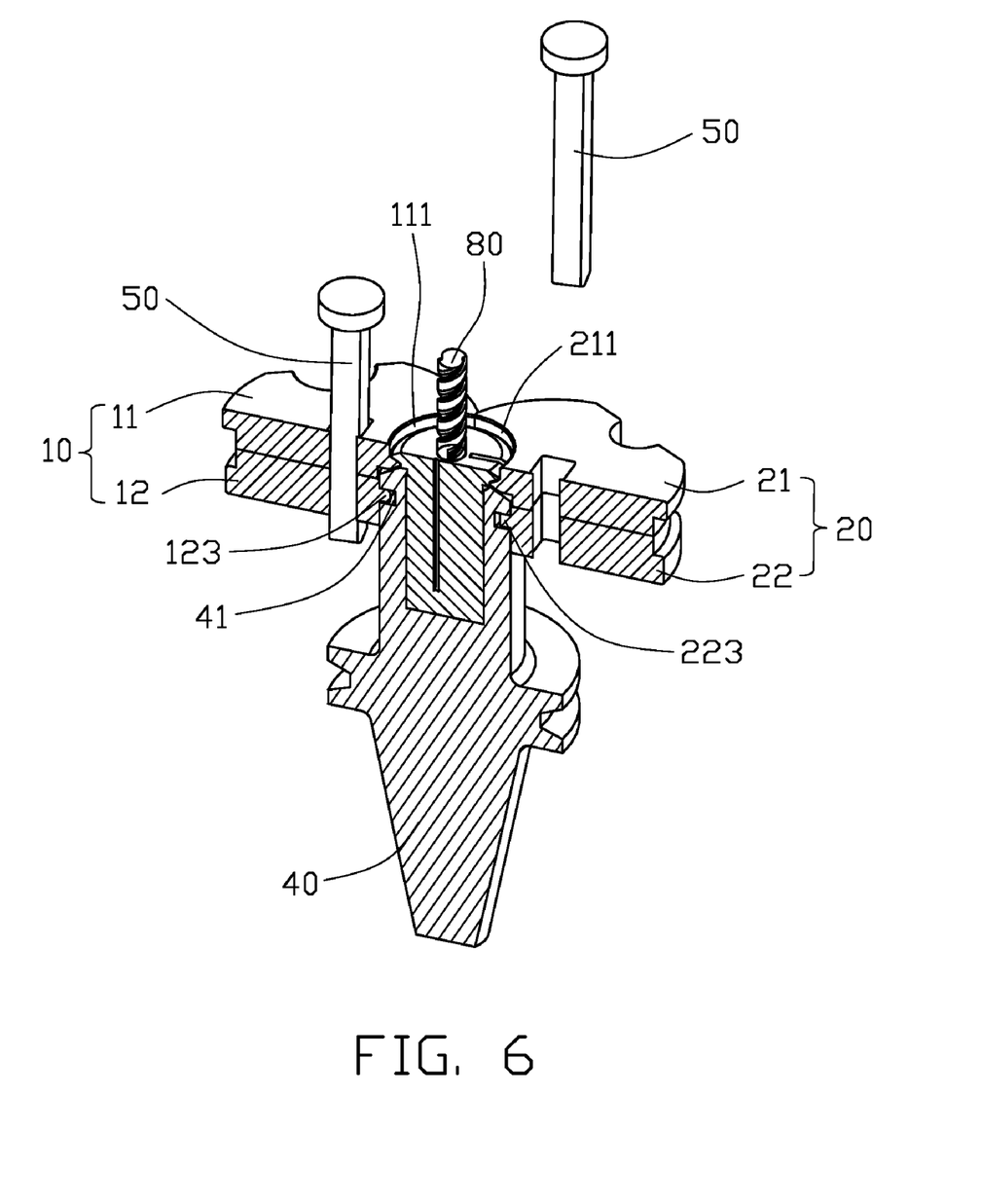
FIG. 6 is similar to FIG. 5, but showing one end of the collet with the cutting tool completely inserted into the collet holder.
Figure 7:
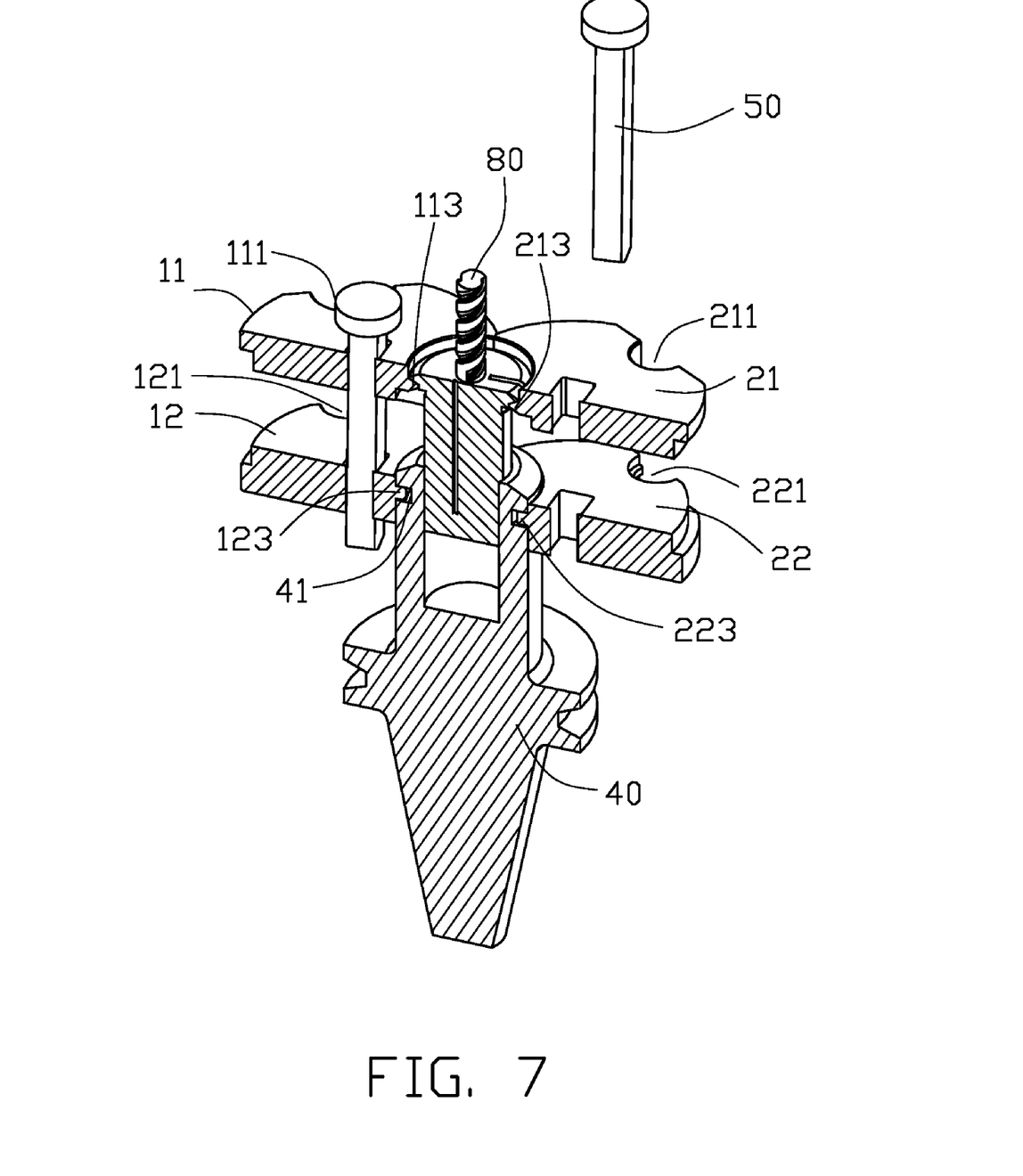
FIG. 7 is similar to FIG. 6, but showing the collet with the cutting tool detached from the collet holder.

Referring to FIGS. 5 through 7, each of the upper clamping elements 11, 21 includes a pushing rim 113, 213 formed on a portion of an inner surface of each of the first latching grooves 111, 211. Each of the pushing rims 113, 213 includes an upper pushing surface and lower pushing surface. Each of the lower clamping elements 12, 22 includes a latching rim 123, 223 formed on a portion of inner surface of each of the second latching grooves 121, 221. The latching rims 123, 223 are configured to engage in a latching groove 41 defined in the collet holder 40.

Figure 10:
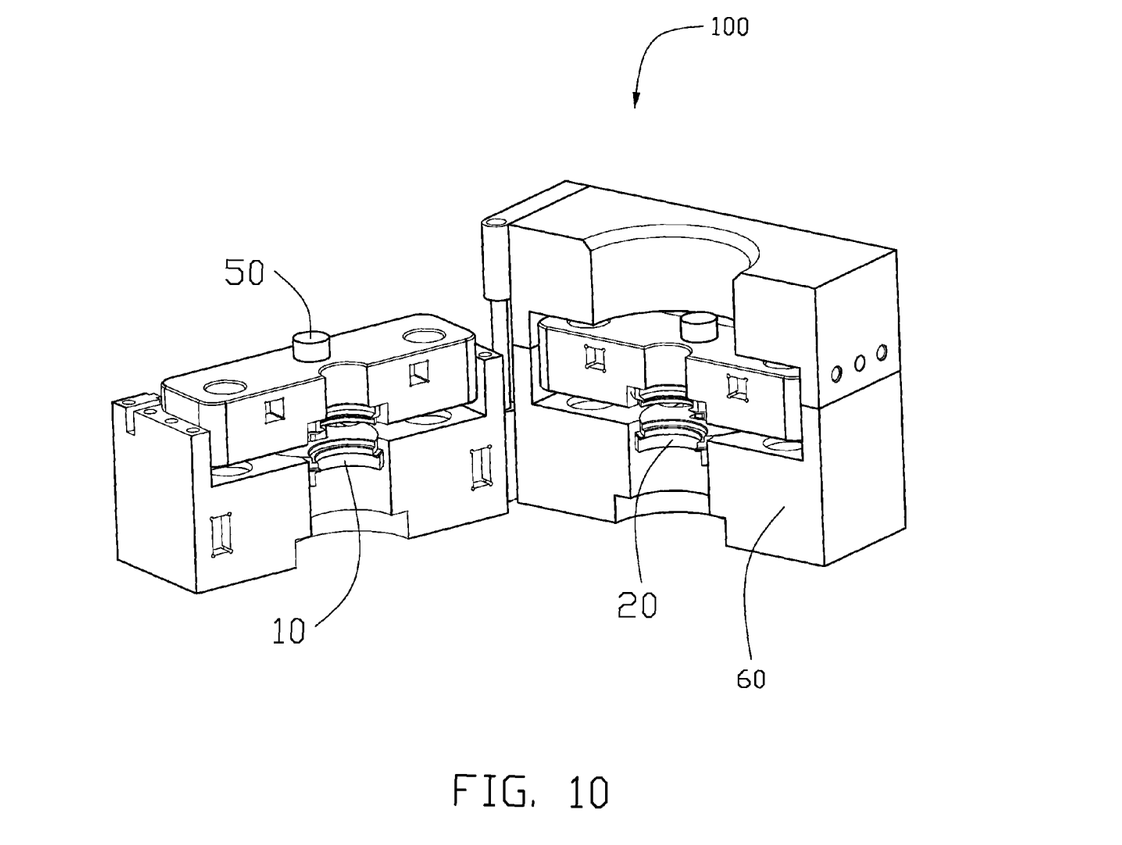
FIG. 10 is similar to FIG. 9, but showing upper clamping elements in a different position.

Referring to FIGS. 2, 5 and 9, to use the pressing device 100, the first movable member 10 and the second movable member 20 are mounted in the driving structure 60. The driving structure 60 is configured for driving the upper clamping elements 11, 21 to move closer to or away from the lower clamping elements 12, 22. In the driving structure 60, the upper clamping elements 11, 21 are set to a determined distance away from the lower clamping elements 12, 22 (see FIG. 10) to receive the collet 30 and the collet holder 40 therebetween respectively. The first movable member 10 is rotated so that one first latching groove 111 and one second latching groove 121 of the first movable member 10 are able to engage with the collet 30 and the collet holder 40 respectively. The second movable member 20 is rotated so that one corresponding first latching groove 211 and one corresponding second latching groove 221 of the second movable member 20 are able to engage with the collet 30 and the collet holder 40 respectively.

Referring to FIGS. 5 through 7 again, to assemble the collet 30 to the collet holder 40, one end of the cutting tool 80 is received in the cylindrical bore of the collet 30. The collet 30 and the collet holder 40 engage with one corresponding first latching groove 111 and one corresponding second latching groove 121 of the first movable member 10 respectively. The collet 30 and the collet holder 40 engage with one corresponding first latching groove 211 and one corresponding second latching groove 221 of the second movable member 20. The collet 30 is below the lower pushing surfaces of the pushing rims 113, 213. The upper clamping elements 11, 21 are driven to move towards the lower clamping elements 12, 22 by the driving structure 60. Thus, the collet 30 is pushed by the pushing rims 113, 213 of the upper clamping elements 11, 21 to move into the tapered recess 42 of the collet holder 40. When the upper clamping elements 11, 21 abut the lower clamping elements 12, 22, the collet 30 with the inserted cutting tool 80 is assembled to the collet holder 40. To detach the collet 30 from the collet holder 40, the collet 30 is positioned above the upper pushing surfaces of the pushing rims 113, 213. The upper clamping elements 11, 21 are driven to move away from the lower clamping elements 12, 22 by the driving structure 60. Thus, the collet 30 with the inserted cutting tool 80 is pushed by the pushing rims 113, 213 of the upper clamping elements 11, 21 to move out of the tapered recess 42 of the collet holder 40.

Figure 8:
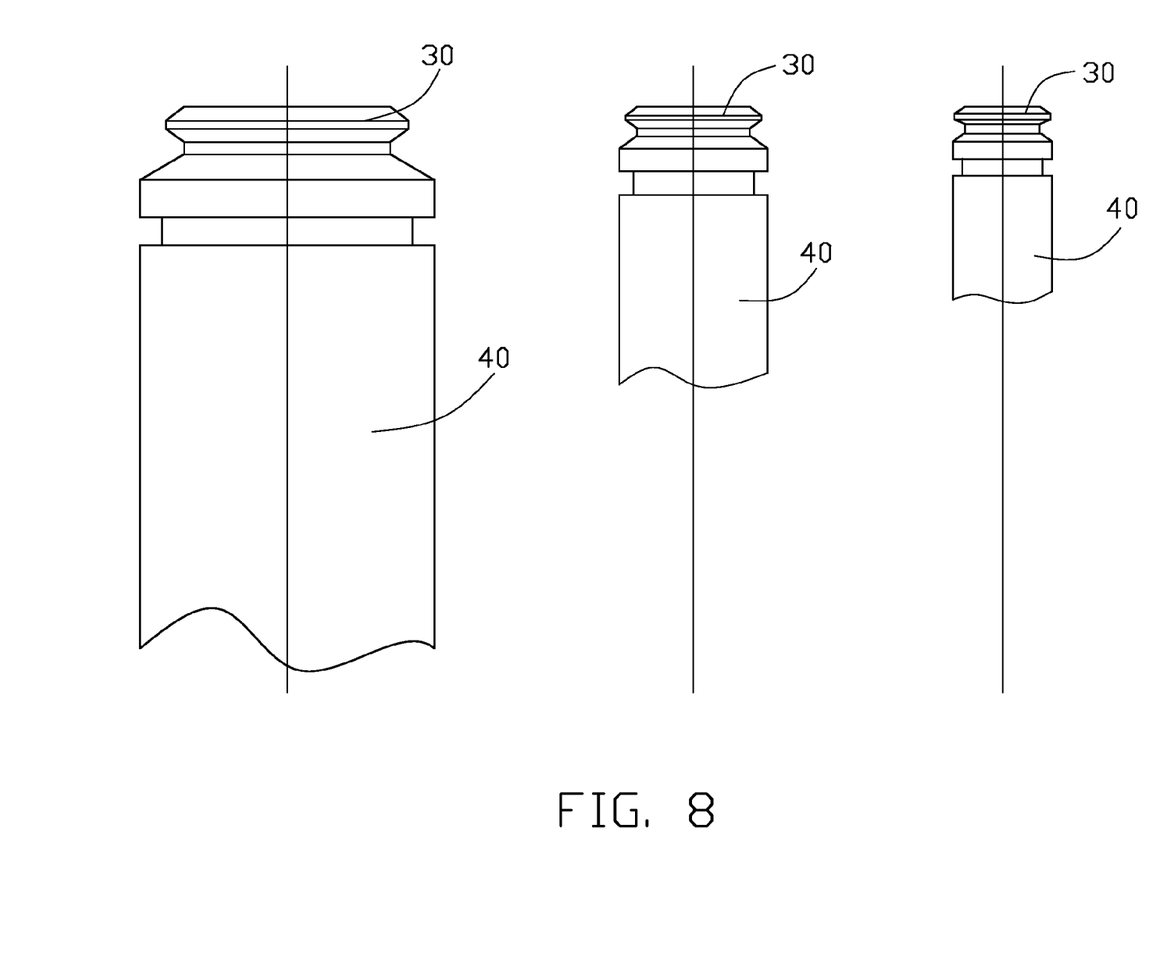
FIG. 8 is an abbreviated, side view of three chucking devices having different sizes.

Referring to FIGS. 1 and 8, the pressing device 100 is able to selectively assemble/receive one of three different size collets 30 and the corresponding one of three different size collet holders 40. When one of the collets 30 is assembled to or detached from its corresponding collet holder 40, the first movable member 10 and the second movable member 20 of the pressing device 100 are rotated. Thus another one of the collets 30 can be assembled to or detached from its corresponding collet holder 40 by the pressing device 100. Therefore, the pressing device 100 is convenient to use in assembling different size collets 30 and their corresponding collet holders 40. It is also convenient to detach the collets 30 and their corresponding collet holders 40. In other words, the pressing device 100 is convenient to be used for assembling different size cutting tools and their corresponding chucking devices and detaching same.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:
1. A pressing device, comprising:
a first movable member including an upper clamping element and a lower clamping element, the upper clamping element having a first fringe portion, a plurality of first latching grooves having different sizes defined in the first fringe portion, the lower clamping element having a second fringe portion, and a plurality of second latching grooves having different sizes defined in the second fringe portion; and
a second movable member including an upper clamping element and a lower clamping element, the upper clamping element having a first fringe portion, a plurality of first latching grooves having different sizes defined in the first fringe portion, the lower clamping element having a second fringe portion, a plurality of second latching grooves having different sizes defined in the second fringe portion, each first latching groove of the second movable member having a same size as that of a corresponding first latching groove of the first movable member, and each second latching groove of the second movable member having a same size as that of a corresponding second latching groove of the first movable member, wherein the first latching grooves are evenly arrayed along a circle having a same center point as the upper clamping element, and the second latching grooves are evenly arrayed along a circle having a same center point as the lower clamping element.

2. The pressing device as claimed in claim 1, further comprising a pair of mounting shafts, one of the mounting shafts connecting the upper clamping element and the lower clamping element of the first movable member so that the mounting shaft is rotatable together with the first movable member, the remaining mounting shaft connecting the upper clamping element and the lower clamping element of the second movable member so that the remaining mounting shaft is rotatable together with the second movable member.

3. The pressing device as claimed in claim 2, wherein each of the upper clamping element and the lower clamping element of the first movable member defines a through hole for one mounting shaft extending therethrough, and each of the upper clamping element and the lower clamping element of the second movable member defines a through hole for the remaining mounting shaft extending therethrough.

4. The pressing device as claimed in claim 1, wherein a number of the first latching grooves and a number of the second latching grooves are both three.

5. The pressing device as claimed in claim 1, wherein the first movable member defines a locating groove in a portion adjoining each second latching groove and a locating protrusion formed at a portion adjoining each corresponding second latching groove of the second movable member, and the locating protrusion is configured for engaging in the corresponding locating groove.

6. The pressing device as claimed in claim 5, wherein the locating protrusion comprises an oblique guiding surface.

7. The pressing device as claimed in claim 1, further comprising a driving structure, wherein the first and second movable members are mounted in the driving structure, the driving structure are configured for driving the upper clamping elements to move closer to or away from the lower clamping elements.

8. The pressing device as claimed in claim 1, wherein the first and second latching grooves are substantially semicircular.

9. The pressing device as claimed in claim 1, wherein each of the upper clamping elements comprises a pushing rim formed on a portion of an inner surface of each first latching groove, and each of the lower clamping elements comprises a latching rim formed on a portion of inner surface of each second latching groove.

10. A pressing device, comprising:
a first movable member including an upper clamping element and a lower clamping element, the upper clamping element having a first fringe portion, at least two first latching grooves having different sizes defined the first fringe portion, the lower clamping element having a second fringe portion, and at least two first latching grooves having different sizes defined in the second fringe portion;
a second movable member including an upper clamping element and a lower clamping element, the upper clamping element having a first fringe portion, at least two first latching grooves having different sizes defined in the first fringe portion, the lower clamping element having a second fringe portion, at least two second latching grooves having different sizes defined in the second fringe portion, each first latching groove of the second movable member having a same size as that of a corresponding first latching groove of the first movable member, and each second latching groove of the second movable member having a same size as that of a corresponding second latching groove of the first movable member; and
a driving structure, the first and second movable members being mounted in the driving structure, the driving structure configured for driving the upper clamping elements to move closer to or away from the lower clamping elements, wherein the first latching grooves are evenly arrayed along a circle having a same center point as the upper clamping element, and the second latching grooves are evenly arrayed along a circle having a same center point the lower clamping element.

11. The pressing device as claimed in claim 10, further comprising a pair of mounting shafts, one of the mounting shafts connecting the upper clamping element and the lower clamping element of the first movable member so that the mounting shaft being rotatable together with the first movable member, the remaining mounting shaft connecting the upper clamping element and the lower clamping element of the second movable member so that the remaining mounting shaft being rotatable together with the second movable member.

12. The pressing device as claimed in claim 11, wherein each of the upper clamping element and the lower clamping element of the first movable member defines a through hole therein for one mounting shaft extending therethrough, and each of the upper clamping element and the lower clamping element of the second movable member defines a through hole therein for the remaining mounting shaft extending therethrough.

13. The pressing device as claimed in claim 10, wherein a number of the first latching grooves and a number of the second latching grooves are both three.

14. The pressing device as claimed in claim 10, the first movable member defines a locating groove in a portion adjoining each second latching groove and a locating protrusion formed at a portion adjoining each corresponding second latching groove of the second movable member, and the locating protrusion is configured for engaging in the corresponding locating groove.

15. The pressing device as claimed in claim 10, wherein the first and second latching grooves are substantially semicircular.

16. The pressing device as claimed in claim 10, wherein each of the upper clamping elements comprises a pushing rim formed on a portion of an inner surface of each first latching groove, and each of the lower clamping elements comprises a latching rim formed on a portion of inner surface of each second latching groove.

17. A pressing device, comprising:
a first movable member including an upper clamping element and a lower clamping element, the upper clamping element having a first fringe portion, a plurality of first latching grooves having different sizes defined in the first fringe portion, the lower clamping element having a second fringe portion, and a plurality of second latching grooves having different sizes defined in the second fringe portion; and
a second movable member including an upper clamping element and a lower clamping element, the upper clamping element having a first fringe portion, a plurality of first latching grooves having different sizes defined in the first fringe portion, the lower clamping element having a second fringe portion, a plurality of second latching grooves having different sizes defined in the second fringe portion, each first latching groove of the second movable member having a same size as that of a corresponding first latching groove of the first movable member, and each second latching groove of the second movable member having a same size as that of a corresponding second latching groove of the first movable member,
wherein the pressing device further comprises a pair of mounting shafts, one of the mounting shafts connecting the upper clamping element and the lower clamping element of the first movable member so that the mounting shaft is rotatable together with the first movable member, the remaining mounting shaft connecting the upper clamping element and the lower clamping element of the second movable member so that the remaining mounting shaft is rotatable together with the second movable member.

* * * * *